United States Patent [15] 3,668,216
Zschocke [45] June 6, 1972

[54] PRODUCTION OF 1,2,4-OXADIAZOLIDINE-3,5-DIONES

[72] Inventor: Albrecht Zschocke, Bad Duerkheim, Germany

[73] Assignee: Badische Anilin- & Soda-Fabrik Aktiengesellschaft, Ludwigshafen/Rhine, Germany

[22] Filed: Dec. 27, 1968

[21] Appl. No.: 787,624

[30] Foreign Application Priority Data

Dec. 30, 1967 Germany ..................P 16 70 299.1

[52] U.S. Cl. ...........................................260/307 B
[51] Int. Cl. .....................................C07d 85/34
[58] Field of Search................................260/307.2

[56] References Cited

UNITED STATES PATENTS 3,437,664    4/1969    Krenzer ..................260/307

Primary Examiner—Alex Mazel
Assistant Examiner—R. V. Rush
Attorney—Johnston, O'Keeffe, Keil, Thompson & Shurtleff

[57] ABSTRACT

Production of 1,2,4-oxadiazolidine-3,5-diones by reaction of substituted hydroxylamines with N-chloroformyl-carbamic esters. The products are valuable starting materials for dyes.

5 Claims, No Drawings

PRODUCTION OF 1,2,4-OXADIAZOLIDINE-3,5-DIONES

The invention relates to the production of 1,2,4-oxadiazolidine-3,5-diones by reaction of substituted hydroxylamines with N-chloroformylcarbamic esters.

It is known that 1,2,4-oxadiazolidine-3,5-diones can be prepared by reaction of N-hydroxyurethanes and isocyanates or by reaction of N-hydroxyureas and chloroformic esters in the presence of alkalies. It is furthermore known that substituted hydroxylamines can be acylated, for example with acid chlorides (U.S. Pat. No. 3,253,021), carbamic acid chlorides (U.S. Pat. Nos. 3,112,342, 3,228,762, 3,278,292 and 3,254,984) or chloroformic esters. Acylation always takes place on the nitrogen of the substituted hydroxylamine in these cases, not on the oxygen.

The object of this invention is a new process for the production of 1,2,4-oxadiazolidine-3,5-diones in a simple way and in good yields.

This and other objects of the invention are achieved and substituted 1,2,4-oxadiazolidine-3,5-diones having the general formula:

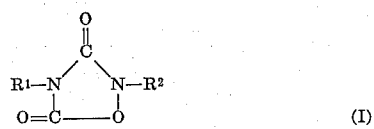

(I)

where $R^1$ denotes an aliphatic or araliphatic radical and $R^2$ denotes a hydrogen atom or an aliphatic, araliphatic, cycloaliphatic or aromatic radical are obtained by reacting hydroxylamines having the general formula:

(II)

where $R^2$ has the above meanings, with N-chloroformylcarbamic esters having the formula:

(III)

where $R^1$ has the above meanings and $R^3$ denotes an aliphatic, araliphatic, cycloaliphatic or aromatic radical.

The reaction may be represented by the following equation in the case of the use of N-phenylhydroxylamine and methyl N-chloroformyl-N-methylcarbamate:

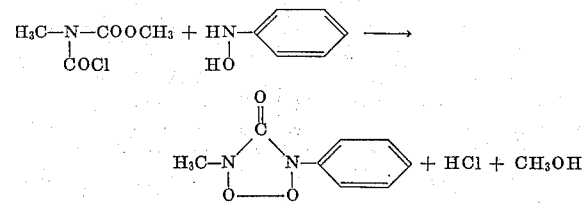

The process according to this invention gives a great number of 1,2,4-oxadiazolidine-3,5-diones in a simple way and in good yields. It is surprising, having regard to the state of the art, that ring closure takes place even in the absence of alkali, i.e., in the acid medium of the starting material, and that the hydroxylamine derivative is acylated by the N-chloroformyl group on the oxygen atom and not on the nitrogen atom.

The substituted hydroxylamines used as starting material (II) may be prepared by known methods, for example by reduction of suitable nitro compounds (Am. Soc., 41, 279 (1919)). The preparation of the esters of N-chloroformylcarbamic acid may be carried out for example by treating the appropriate carbamic ester with phosgene.

Preferred starting materials (II) and therefore preferred end products (I) are those in whose formulas $R^2$ denotes a hydrogen atom or an alkyl, aralkyl, cycloalkyl or aryl group in each case having up to twenty-four, particularly twelve, carbon atoms. The said groups may be contain, as substituents, atoms and/or groups which are inert under the reaction conditions, for example chlorine or bromine atoms or trifluoromethyl, hydroxy, nitro sulfonamido, alkoxy, alkylmercapto, alkylsulfonyl, N-alkylcarbamoyloxy, N-arylcarbamoyloxy and/or alkylamino groups, in each case with up to six carbon atoms.

For example the following hydroxylamine derivatives may be used as starting materials (II):
N-phenylhydroxylamine, N-cyclohexylhydroxylamine, N-4-chlorophenylhydroxylamine, N-3-chlorophenylhydroxylamine, N-3-trifluoromethylphenylhydroxylamine, N-3-chloro-4-toluylhydroxylamine, N-3,4-dichlorophenylhydroxylamine, N-4-bromophenylhydroxylamine, N-isopropylhydroxylamine, N-3-hydroxyphenylhydroxylamine, N-4-sulfonamidophenylhydroxylamine, N-3-nitrophenylhydroxylamine, N-benzylhydroxylamine, N-3-methylsulfonylphenylhydroxylamine, N-3-(N'-methylcarbamoyloxy)-phenylhydroxylamine, N-4-methoxyphenylhydroxylamine, N-4-ethylmercaptophenylhydroxylamine, N-4-diethylaminophenylhydroxylamine.

Preferred starting materials (III) and therefore end products (I) are those in whose formulas $R^1$ denotes an alkyl, alkenyl or aralkyl radical in each case having up to 10 carbon atoms. The said radicals may also bear, as substituents, atoms and/or groups which are inert under the reaction conditions, for example chlorine or bromine atoms or cyano, nitro, trifluoromethyl, cycloalkyl, alkoxy, aroxy, alkylmercapto, arylmercapto and/or alkylamino groups, in each case having up to 10 carbon atoms. In the preferred starting materials (III) $R^3$ is preferably a methyl or ethyl group because these radicals are eliminated during the reaction. An alkyl, aralkyl, cycloalkyl or aryl group, in each case having up to 10 carbon atoms, and which may bear, as substituents, groups which are inert under reaction conditions are however other possible substituents $R^3$. As a rule the starting material (III) is used in a stoichiometric amount with reference to starting material (II), but one of the two may be used in excess with reference to the other starting material.

The following are examples of N-chloroformylcarbamic esters which may be used as starting materials (III): the methyl, ethyl, cyclohexyl, benzyl and phenyl esters of N-chloroformyl-N-methylcarbamic acid, N-chloroformyl-N-isopropylcarbamic acid, N-chloroformyl-N-benzylcarbamic acid, N-chloroformyl-N-chloroethylcarbamic acid and N-chloroformylcarbamic acid.

The process according to the invention may be carried out in the absence or presence of alkaline substances such as alkali metal or alkaline earth metal alcoholates, carbonates or organic tertiary amines as for example pyridine, triethylamine, dimethylaniline. These substances are generally used in an amount of from 50 to 150 percent by weight with reference to starting material (III).

The process according to this invention is advantageously carried out in a solution or suspension of the starting materials. Examples of suitable solvents which are inert under the reaction conditions are: cyclic ethers such as tetrahydrofuran or dioxane; aromatic hydrocarbons such as xylene or toluene; cycloaliphatic hydrocarbons such as cyclohexane; ketones such as acetone; and also mixtures of the said solvents. Aliphatic alcohols such as methanol or ethanol or mixtures thereof with water are especially suitable as solvents.

The process is carried out as a rule in the temperature range from −20° to +100° C, preferably from 0° to 50° C, at atmospheric or superatmospheric pressure, continuously or batchwise. It is generally carried out in the presence of an inert gas, for example nitrogen. The reaction may be carried out for example as follows: starting material (II) with or without one or more solvents is slowly added to the starting material (III) at the reaction temperature while stirring. The reaction is over within from 20 minutes to 3 hours and the end product formed is separated by a conventional method, for example by filtration, evaporation of the solvent and precipitation with water followed by filtration. The end product may be purified if necessary by washing with water or a mixture of water and ethanol.

The compounds which can be prepared by the process according to this invention are valuable starting materials for dyes. Some of them are described in Belgian Pat. specification No. 695,648. Reference is made to the abovementioned publications as regards uses.

The invention is illustrated by the following examples. The parts given in the examples are by weight.

EXAMPLE 1

21.8 parts of N-phenylhydroxylamine is dissolved in 140 parts of ethanol and 60 parts of water and in an atmosphere of nitrogen 30.2 parts of N-chloroformyl-N-methylcarbamic methyl ester is added at a temperature of from 15° to 20° C while stirring well. The precipitate which is deposited is suction filtered, washed with dilute ethanol and dried. 36 parts (equivalent to 95 percent of the theory) of 2-phenyl-4-methyl-1,2,4-oxadiazolidine-3,5-dione having a melting point of 99° C is obtained.

EXAMPLE 2

11.5 parts of N-cyclohexylhydroxylamine is dissolved in 70 parts of ethanol and 30 parts of water and mixed under nitrogen at room temperature with 4 parts of sodium hydroxide dissolved in 15 parts of water while stirring well. 15.1 parts of methyl N-chloroformyl-N-methylcarbamate is slowly added to the resultant solution at a temperature of from 20° to 30° C. The reaction mixture is then stirred for another hour at room temperature. The solvent is evaporated, the residue is taken up in acetone, the acetone solution is filtered from insoluble sodium chloride and the filtrate is concentrated in vacuo. 15 parts (76 percent of the theory) of 2-cyclohexyl-4-methyl-1,2,4-oxadiazolidine-3,5-dione is obtained; $n_D^{25}$ 1.4823.

EXAMPLE 3

28.6 parts of N-4-chlorophenylhydroxylamine is dissolved in 150 parts of toluene and 15 parts of tetrahydrofuran and in an atmosphere of nitrogen 30.2 parts of methyl N-chloroformyl-N-methylcarbamate is added while stirring well at a temperature of from 15° to 20° C. 20 parts of triethylamine is then added slowly at 25° to 40° C. The reaction mixture is stirred for some time at room temperature, 100 parts of water is added, and the precipitate formed is suction filtered, washed with water and dried. 41 parts (91 percent of the theory) of 2-(4-chlorophenyl)-4-methyl-1,2,4-oxadiazolidine-3,5-dione is obtained having a melting point of from 117° to 119° C.

The following compounds given in the Table can be obtained by the process according to this invention following the procedure of Example 1, 2 or 3:

TABLE 1

$$\begin{array}{c} O \\ \parallel \\ R^1-N \overset{C}{\diagup} \diagdown N-R^2 \\ | \quad\quad | \\ O=C---O \end{array}$$

| Parts of starting material | | $R^1$ | $R^2$ | M. pt., °C. | Parts of end product | Percent of theory |
|---|---|---|---|---|---|---|
| II | III$^a$ | | | | | |
| 10.9 | 17.9 | H$_3$C–HC–/H$_3$C (isopropyl) | –C$_6$H$_5$ | 60–62 | 17 | 77 |
| 10.9 | 22.7 | C$_6$H$_5$–CH$_2$– | –C$_6$H$_5$ | 115 | 22.6 | 85 |
| 35.4 | 30.2 | CH$_3$– | –C$_6$H$_4$–CF$_3$ | 50–52 | 43.5 | 84 |
| 15.7 | 15.1 | CH$_3$– | –C$_6$H$_3$(CH$_3$)(Cl) | 93 | 21.9 | 91 |
| 15.7 | 17.9 | CH$_3$–CH–/CH$_3$ (isopropyl) | –C$_6$H$_3$(CH$_3$)(Cl) | 66 | 21.2 | 79 |
| 28.6 | 35.8 | CH$_3$–CH–/CH$_3$ (isopropyl) | –C$_6$H$_4$–Cl | 56 | 39.2 | 77 |
| 28.6 | 40 | ClCH$_2$–CH$_2$– | –C$_6$H$_4$–Cl | 91 | 45.5 | 83 |
| 14.3 | 15.1 | CH$_3$– | –C$_6$H$_4$–Cl | 78 | 16 | 71 |
| 26.7 | 22.7 | CH$_3$– | –C$_6$H$_3$Cl$_2$ | 124 | 35 | 90 |
| 9.4 | 7.6 | CH$_3$– | –C$_6$H$_4$–Br | 122 | 11.6 | 86 |
| 9.4 | 9 | CH$_3$–CH–/CH$_3$ (isopropyl) | –C$_6$H$_4$–Br | 65 | 12.3 | 82 |

TABLE 1—Continued

| Parts of starting material II | III a | R¹ | R² | M. pt., °C. | Parts of end product | Percent of theory |
|---|---|---|---|---|---|---|
| 11.5 | 17.9 | $CH_3$\\$CH$-/$CH_3$ | —⟨ ⟩—H | 53 | 18 | 80 |
| 15 | 33.2 | $CH_3CH_2$— | —CH($CH_3$)($CH_3$) B. pt., 1.5 mm. | 68–71 | 23.4 | 68 |
| 29.4 | 23 | $CH_3$— | —⟨ ⟩—$OCON(CH_3)_2$ | 80 | 29 | 69 |
| 18.7 | 15.1 | $CH_3$— | —⟨ ⟩—$SO_2CH_3$ | 176–78 | 20.3 | 76 |
| 125 | 151 | $CH_3$ | —⟨ ⟩—OH | 175 | 177 | 85 |
| 21.6 | 17.4 | $CH_3$ | —⟨ ⟩—$SO_2NH_2$ | 130 | 24.8 | 80 |
| 31.8 | 22.7 | $CH_3$ | —⟨ ⟩(Cl)(Cl)–Cl | 113 | 36.8 | 83 | a $R^3$=methyl.

We claim:

1. A process for the production of substituted 1,2,4-oxadiazolidine-3,5-diones having the formula:

$$R^1-N-\underset{\underset{O}{\|}}{C}-N-R^2$$
$$O=C\text{------}O \quad \text{(I)}$$

where $R^1$ denotes an unsubstituted alkyl, alkenyl or aralkyl having from one to 10 carbon atoms or said alkyl, alkenyl or aralkyl substituted by chlorine, bromine, cyano, nitro or trifluoromethyl, or substituted by a cycloalkyl, alkoxy, aroxy, alkylmercapto, arylmercapto, or alkylamino having up to 10 carbon atoms and $R^2$ denotes hydrogen or an unsubstituted alkyl, aralkyl, cycloalkyl or aryl having from one to 12 carbon atoms or said alkyl, aralkyl, cycloalkyl or aryl substituted by chlorine, bromine, trifluoromethyl, hydroxy, nitro, sulfonamido, or substituted by alkoxy, alkylmercapto, alkylsulfonyl, N-alkylcarbamoyloxy, or alkylamino having from one to six carbon atoms which comprises reacting a hydroxylamine having the formula:

$$R^2-NH$$
$$\phantom{R^2-}\,|$$
$$\phantom{R^2-}\,OH \quad \text{(II)}$$

where $R^2$ has the meanings given above with a N-chloroformylcarbamic ester having the formula:

$$R^1-N-COOR^3$$
$$\phantom{R^1-}\,|$$
$$\phantom{R^1-}\,COCl \quad \text{(III)}$$

where $R^1$ has the meanings given above and $R^3$ denotes alkyl, aralkyl, cycloalkyl or aryl of one to 10 carbon atoms, said process being carried out in the presence of a solvent which is inert under the reaction conditions, said process further being carried out at a temperature from −20° to +100° C.

2. A process as claimed in claim 1 carried out at a temperature of from 0° to 50° C.

3. A process as in claim 1 wherein said process is carried out in the presence of material selected from the group consisting of sodium hydroxide, pyridine, triethylamine and dimethyl aniline in an amount of from 50 to 150 percent by weight with reference to starting material (III).

4. A process as in claim 1 wherein said inert solvent is an aliphatic alcohol.

5. A process as in claim 1 wherein said inert solvent is an aliphatic alcohol mixed with water.

* * * * *